United States Patent [19]
Hickman et al.

[11] Patent Number: 6,105,000
[45] Date of Patent: Aug. 15, 2000

[54] FINANCIAL REBATE PROGRAM FOR UTILITIES BASED ON DEGREE DAYS

[75] Inventors: James E. Hickman, Lenexa; Sushil Nelson, Shawnee, both of Kans.

[73] Assignee: Aquila Risk Management Corporation, Omaha, Nebr.

[21] Appl. No.: 08/951,115

[22] Filed: Oct. 15, 1997

Related U.S. Application Data

[60] Provisional application No. 60/028,136, Oct. 16, 1996.

[51] Int. Cl.⁷ .................................................. G06F 17/60
[52] U.S. Cl. ............................. 705/10; 705/400; 705/412
[58] Field of Search ................................ 705/1, 4, 7, 10, 705/400, 412, 413

[56] References Cited

U.S. PATENT DOCUMENTS

| | | | |
|---|---|---|---|
| 4,218,737 | 8/1980 | Buscher et al. | 364/493 |
| 4,399,510 | 8/1983 | Hicks | 364/464 |
| 4,591,988 | 5/1986 | Klima et al. | 364/464 |
| 4,598,367 | 7/1986 | DeFrancesco et al. | 364/408 |
| 4,642,768 | 2/1987 | Roberts | 364/408 |
| 4,722,055 | 1/1988 | Roberts | 364/408 |
| 4,750,119 | 6/1988 | Cohen et al. | 364/401 |
| 4,752,877 | 6/1988 | Roberts et al. | 364/408 |
| 4,766,539 | 8/1988 | Fox | 364/401 |
| 4,839,804 | 6/1989 | Roberts et al. | 364/408 |
| 4,887,207 | 12/1989 | Natarajan | 364/401 |
| 4,908,761 | 3/1990 | Tai | 364/401 |
| 4,924,386 | 5/1990 | Freedman et al. | 364/402 |
| 4,924,404 | 5/1990 | Reinke, Jr. | 364/464.04 |
| 4,975,840 | 12/1990 | DeTore et al. | 364/401 |
| 5,056,019 | 10/1991 | Schultz et al. | 364/405 |
| 5,200,889 | 4/1993 | Mori | 364/401 |
| 5,202,827 | 4/1993 | Sober | 364/408 |
| 5,293,310 | 3/1994 | Carroll et al. | 364/408 |
| 5,414,640 | 5/1995 | Seem | 364/493 |
| 5,424,958 | 6/1995 | Knupp | 364/493 |
| 5,459,656 | 10/1995 | Fields et al. | 364/401 |
| 5,546,564 | 8/1996 | Horie | 395/500 |
| 5,566,084 | 10/1996 | Cmar | 364/492 |

*Primary Examiner*—Edward R. Cosimano
*Attorney, Agent, or Firm*—Hovey, Williams, Timmons & Collins

[57] ABSTRACT

A financial rebate program provides a rebate to purchasers or sellers of energy such as electrical power and natural gas for a deviation from expected weather conditions. In one example, the buyer of a block of electrical power for a given winter month pays a premium as a percent of the value of the transaction. If the weather is warmer than normal, the heating degree days would be less and the demand for electrical power would also be less because of reduced electrical heating load. As a result, the buyer might have to sell the excess power at a discount. The buyer would receive a rebate based on the number of degree days below a given strike, such as ninety-five percent of normal, helping to offset the discount thereby minimizing a component of financial risk of the transaction.

29 Claims, 1 Drawing Sheet

FINANCIAL REBATE PROGRAM FOR UTILITIES BASED ON DEGREE DAYS

RELATED APPLICATIONS

This application claims priority of Provisional patent application Ser. No. 60/028,136 filed Oct. 16, 1996.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention generally relates to the field of financial rebates for buyers and sellers of bulk energy. More particularly, the invention is concerned with a financial rebate program that provides a rebate to purchasers or sellers of energy such as electrical power and natural gas for a deviation from expected weather conditions.

2. Description of the Prior Art

Utilities often purchase or sell bulk energy. For example, an electric utility may need to purchase electrical power at certain times of the year and at other times, may have excess generating capacity and need to sell electrical power to other utilities. The same is true for natural gas utilities and also for other companies that may engage in the business of purchasing and selling bulk energy.

The size of the transactions involving bulk energy often place the sellers or buyers at substantial financial risk because of the lack of precision in weather forecasts. For example, a utility may buy a block of electrical power for a given winter month based on anticipated heating load. If the weather is warmer than normal, the utility may not need all of the power it purchased and may have to sell the excess power at a discount. This often represents a substantial and unavoidable financial risk. A financial risk is also presented if actual demand exceeds anticipated demand requiring the utility to purchase additional energy at a premium price. Similar risks also exist for deviations in other weather related parameters such as rainfall, water run-off, river flow rates, water temperature, snow fall and snow accumulation as they relate to hydro-electric power generators, for example.

SUMMARY OF THE INVENTION

The present invention solves the prior art problems discussed above and represents a distinct advance in the state of the art. In particular, the financial rebate system hereof enables sellers and buyers of bulk energy to minimize components of financial risk because of deviations in weather related parameters.

The preferred embodiment of the present invention includes a weather guarantee computer program stored on a computer-readable memory device for directing the operation of a computer, a computer specially programmed with the weather guarantee program, and method. In particular, the system hereof receives information representative of a specified location and time-of-year interval. This interval typically includes a plurality of days and preferably a month or more. The system also receives historical weather data concerning a weather-related parameter for the location and interval.

A rebate amount is calculated as a function of the historical weather data, a specified premium, and the deviation in the weather-related parameter from a specified strike. The system provides an output representative of the rebate.

In one embodiment, the weather related parameter is degree days and the system calculates a plurality of rebates for a corresponding plurality of customer-selectable premiums based upon the value of a bulk energy transaction. The rebates are expressed as a percentage or a money amount for each degree day deviation during the interval from a specified strike, e.g., five percent above or below the norm for the interval. Other preferred aspects of the present invention are disclosed herein.

DETAILED DESCRIPTION OF THE PREFERRED EMBODIMENT

Figure 1:
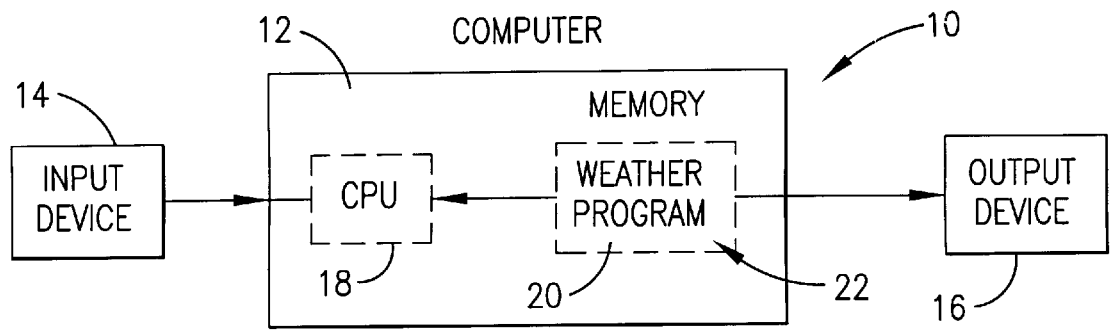
FIG. 1 illustrates the preferred apparatus of the present invention.

As illustrated in FIG. 1, apparatus in accordance with the present invention includes special purpose computer 12, input device 14 and output device 16. Computer 12 is preferably a conventional microcomputer or mainframe computer and includes, along with other standard hardware components, central processing unit (CPU) 18 and memory 20 as a computer-readable device having preferred guarantee weather computer program stored thereon for directing the operation of computer 12 and in particular, for directing the operation of CPU 18. Memory 20 includes any conventional computer-readable memory device such as RAM, ROM, hard drive, floppy drive, CD ROM, tape drive and the like with the preferred weather guarantee program 22 stored thereon.

Input device 14 is used for receiving historical weather data concerning specified weather related parameters, forecast weather data, and other selected information as described further herein for use by program 22. As such, input device 14 can be any device for receiving the needed information such as a keyboard, modem, floppy drive, hard drive, CD ROM, tape drive or the like. Output device 16 is used for producing outputs representative of the product of program 22 including a weather guarantee in the nature of an insurance policy. Accordingly, output device 16 can include any device for providing needed output such as a printer, modem, monitor, or memory device such as those mentioned above.

In the operation of apparatus 10, and implementation of the preferred method of the present invention, weather guarantee program 22 preferably operates in two stages. In the first stage, program 22 produces a set of premiums, corresponding rebates, and corresponding maximum rebates expressed as a percentage for a specified strike for a given location and time-of-year interval. The second stage then applies these percentages to a particular transaction having a value. Appendix A incorporated as part of the disclosure hereof illustrates particular computer program segments of program 22.

Figure 2:
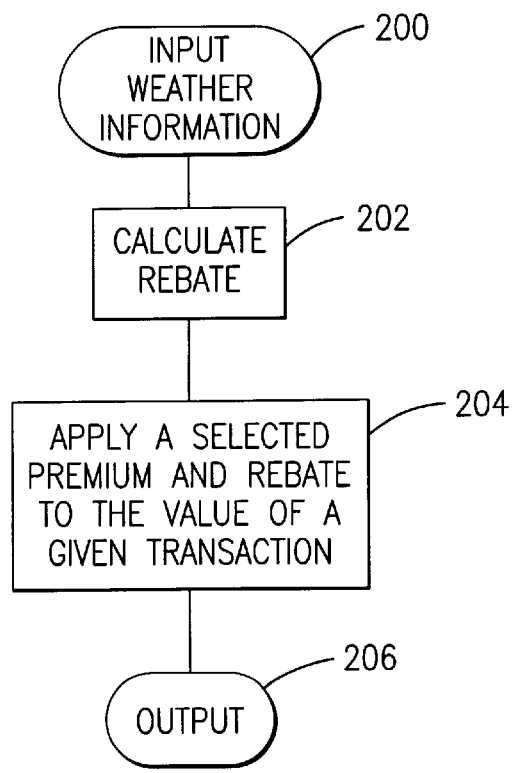
FIG. 2 is a flow diagram broadly depicting certain steps performed by the computer program of the present invention.

As shown in FIG. 2 in more detail for the first stage, program 22 receives during step 200 by way of input device 14 historical weather data (preferably 20 years of data) for a specified location and specified time-of-year interval. For example, the location could be Baltimore-Washington International Airport, the time-of-year interval could be January, and the weather related parameter could be heating degree days (HDD). Program 22 also receives a weather forecast for the specified month.

Program 22 initially analyzes the historical weather data to determine the best fit curve for the data, preferably using Palasade Corporation's BestFit program. This program presents the user with a selection of best fit curves and one of these is selected. For example, if the best fit for the data was determined to be a normal distribution, the user would also enter by way of input device 14 the appropriate code for the selected curve, in this example a normal curve, and the mean and standard deviation as provided by the BestFit program.

Program 22, written in the Matlab programming language, samples possible weather outcomes based on historical weather statistics derived from the weather data using a modification of the Latin Hypercube algorithm which stratifies the cumulative distribution of the weather measure into equal intervals on the cumulative probability scale. Each interval is called a "bin" and an equal number of random samples is first developed for each bin in order to assure that all possible weather outcomes are accounted for, especially extreme cases at opposed ends of the distribution curve. A vector of samples for the chosen weather phenomenon is developed for each bin.

In the example of the normal curve, the weather distribution curve is divided into six bins with up to two thousand sampling scenarios in each bin as part of a 6×2000 matrix. The two middle bins represent historically normal weather, the two highest bins represent above normal, and the two lowest bins represent below normal.

These bins are then sampled according to the weather forecast for the specified interval. For example, an "above normal" temperature forecast (based on an empirical evaluation of the accuracy of the forecast) might be represented as a probability of 45% for the top two bins, 30% for the middle two bins, and 25% for the bottom two bins. In the top two bins, all of the sampling scenarios would be used. For each of the middle two bins, 67% of the scenarios would be used (30%÷45%), and for each of the bottom two bins, 55.5% (25%÷45%) would be used.

For each scenario, a starting transaction value and starting payout per degree day deviation are specified along with a strike as a percentage of the norm. A premium amount is also calculated as 1% of the starting transaction value, and a maximum payout is calculated as a multiple of the premium such as six times the premium. Next, program 22 calculates the expected margin for a specified premium and for a specified payout per degree day deviation for each sampled scenario as limited by the maximum payout. The expected margins for all the scenarios are averaged to produce an expected average margin and compared to a target margin.

If the expected average margin is more or less than the target margin, then the specified payout is altered according to the following algorithm:

(1) Simulate the expected (mean) number of units of the given weather measure meeting the specified strike condition,
(2) Divide the difference between the simulated expected margin and the target margin by the results of (1) to obtain the payout adjustment,
(3) Add results of (2) to the payout used in the previous simulation and run a new simulation, and
(4) Continue steps (2) and (3) until the payout adjustment (rounded) is zero.

Program 22 then converts the payout to a percentage of the starting transaction value. Thus, the premium, payout and maximum payout are expressed as a percentage of the transaction value. In this way, these values can be applied to a transaction of any value for the specified location and interval.

The calculations described above are then repeated for other premium options such as 2%, 3%, 4% and 5% of the transaction value. For each premium, a corresponding rebate is determined during step 202 as a percentage along with the maximum rebate. For the higher premium options, the target margins can be lowered, if desired.

Finally, a set of premium options are calculated for each specified strike. For example, selectable strike levels might include 90%, 91%, 92%, 93%, and 94% of normal or 105%, 106%, 107%, 108%, 109% and 110%. This completes stage 1.

In stage 2, during step 204 the various premium and strike options calculated above as percentages are applied to a particular transaction value. An example is illustrated by the table below for the example of Baltimore-Washington International Airport during January where the normal heating degree days (HDD) is 1024 at a strike of 95% (973 HDD):

| Premium | Rebate/HDD Below Strike | Max Rebate |
|---|---|---|
| 1% Option: $5,000 | $79 | $30,020 |
| 2% Option: $10,000 | $160 | $60,000 |
| 3% Option: $15,000 | $242 | $90,024 |
| 4% Option: $20,000 | $327 | $120,009 |
| 5% Option: $25,000 | $413 | $149,919 |

In this example, the transaction value is $500,000 for 25,000 MWh at $20 per MWh. For this transaction, the buyer can select any of the premium options and would be paid the corresponding rebate amount for each HDD below the strike of 973. For example, for the 1% option, the buyer would pay a premium of $5,000. If the actual HDD were 900, then the buyer would receive a rebate of $5,767 ((973 strike−900 actual)×$79/HDD). However, if the actual HDD were within 5% of normal, then the buyer would receive no rebate. Similar tables can be developed for various strike levels as desired for selection by the buyer.

As will be appreciated, risk can be minimized, for example, by selecting the highest premium option and a strike representing the lowest deviation from the norm. Conversely, less risk is avoided by selecting the lowest option and a strike representing a high deviation from the norm. In this way, the buyer can decide how much risk is to be avoided. Once this decision is made, and a premium and strike are selected, the buyer can be provided during step 206 with a printout from output device 16 in the nature of an insurance policy for a transaction.

It will also be appreciated that the rebate can be structured to pay the buyer if temperatures are warmer than normal. In such a case, the strike levels would be above the norm and would offset the risk of a warmer than expected summer month, for example, in which the buyer would have to purchase additional energy at a premium price.

Similarly, sellers can also minimize risk. If demand for energy increases during the specified month and energy prices rise as a result, then the seller has lost an opportunity for higher margins. The guarantee weather system of the present invention can minimize this risk for the seller. That is, the seller sells at a discount (analogous to a premium) as a selected percentage of the transaction value and receives the specified adder (analogous to a rebate) if the weather condition deviates from the selected strike.

Finally, the present invention encompasses a wide variety of weather related conditions other than heating or cooling degree days. These other conditions include rainfall, water run-off, river flow rates, water temperature, snow fall and snow accumulation, for example, which also relate to energy consumption and prices.

The weather-related parameter includes one of heating degree days, cooling degree days, rainfall, water run-off, river flow rates, water temperature, snow fall and snow accumulation.

APPENDIX A

Simulation Methodology

A stratified proportional sampling methodology is used to simulate several thousand possible weather scenarios for the given weather measure for each station and period of time. The sampling process requires statistical weather and weather forecast inputs as follows.

The spreadsheet has inputs for the type of probability distribution which best describes the weather data to be sampled, and for the parameters of the chosen probability distribution. For example, if historical heating degree day data for January at New York Central Park were analyzed in a curve fitting program such as Palasade Corporation's BestFit, and the best fit for the data was determined to be the normal distribution, then the analyst would enter the required code for the normal distribution (e.g., 2). He would then need to enter the required parameters for that distribution, which in this case would be the mean and standard deviation for January heating degree days in Central Park. The mean is computed as follows:

$$\mu = \frac{\sum_{i=1}^{N} x_i}{N}$$

where X is the total heating degree days for January in Central Park for years 1 .. .N. (The analyst would probably want at least 20 years of historical degree day data to analyze.)

The standard deviation could then be calculated as follows:

$$\sigma = \sqrt{\sum_{i=1}^{N} (x_i - \mu)^2 / N}$$

These statistics are then used in the sampling process. The sampling technique used is a modification of the Latin Hypercube algorithm, which stratefies the cumulative distribution function of the weather measure (in this case, the normal cumulative distribution function) into equal intervals on the cumulative probability scale. Each interval is called a "bin," and an equal number of random samples is first developed for each bin in order to best assure that all possible weather outcomes (especially extreme cases out on the tails of the distributions) are properly accounted for. A vector of samples for the chosen weather phenomenon, in this case heating degree days, is developed for each bin using the following fomula (for the normal distribution):

for i = 1:2000 for j = 1:bins sample(i, j) = norminv((rand + j − 1)/bins, mu, sig);

where i=number of samples for each bin j=number of bins rand=random number from 0 to 1 mu=mean sig=standard deviation

The inverse of the chosen probability function (norminv) finds the heating degree day total associated with the randomly chosen cumulative probability. The formula for the inverse of the normal distribution function is:

$$x = F^{-1}(p|\mu,\sigma) = \{x; F(x|\mu,\sigma) = p\}$$

where $$p = F(x \mid \mu, \sigma) = \frac{1}{\sigma\sqrt{2\pi}} \int_{-\infty}^{x} e^{\frac{-(t-\mu)^2}{2\sigma^2}} dt$$

If the number of bins chosen is 6, the result of running the above formula would be a 2000 by 6 matrix of possible heating degree day outcomes.

An example of the (Matlab) code for sampling technique (for a truncated normal distribution, with a minimum and maximum degree day total) is as follows:

```
function [sample,adj,adj80,adj90] = latin(strike,mu,sig,nmx,nmn,bins)
%
%
%
sample = zeros(2000,bins);
adjust = zeros(2000*bins,1);
%
% Set up the truncation of the normal distribution
%
   upper = normcdf(nmx,mu,sig);
   lower = normcdf(nmn,mu,sig);
%
% Get the DD values corresponding to the random number bins
%
for i = 1:2000
  for j = 1:bins
    sample(i,j) =
    norminv((lower + ((rand + j-1)/bins)*(upper-lower)),mu,sig);
    if sample(i,j) > strike*mu
      adjust((i-1)*bins+j,1) = 0;
    else
      adjust((i-1)*bins+j,1) = strike*mu - sample(i,j);
    end
  end
end
adj = mean(adjust);
adj80 = prctile(adjust,80);
adj90 = prctile(adjust,90);
```

The "adjust" variable is developed to calculate the mean, 80th and 90th percentiles for the number of degree days below the strike amount (which is used as explained below).

Finally, a modification to the latin hypercube sampling methodology is made to incorporate the weather forecast for heating degree days. Entered into the spreadsheet is the probability of above normal, normal and below normal values for the given weather phenomenon given the forecast. For example, if the forecast calls for above normal temperatures (below normal heating degree days) for January in Central Park, it does not mean that there is no chance for normal or above normal temperatures. However, it might mean that, instead of an equal probability for above normal, normal or below normal temperatures, there is instead a 45% probability for above normal temperatures, a 30% chance for normal, and a 25% chance for below normal temperatures.

These probabilities for each possible weather forecast (developed based upon input from various government and private forecast vendor sources, as well as in-house statistical analyses of long-range forecast accuracy) are contained within lookup tables in the spreadsheet so that the analyst can simply choose among the forecast choices, and the correct probabilities are developed for input into the Matlab program.

The forecast probabilities are used to alter the number of samples taken from each weather bin as follows:

for g=1:bins binsize(g,m)=round((2000*dd_val(g, m))/max(dd_val(:,m)));

where:

dd_val is the probability for weather associated with the given bin

For example if the forecast were for below normal heating degree days, the bins containing below normal samples (e.g., bins 1 and 2 if there were 6 bins) might have a combined probability (dd_val) of 45% (the probability of total heating degree days actually being below normal given that the forecast is for below normal heating degree days). Since this would be the maximum probability, dd_val divided by the maximum dd_val would be 1; thus, the binsize for these bins would remain at the maximum of 2000. Alternatively, the bins containing normal samples (e.g., bins 3 and 4 given 6 bins) might have a combined probability of 30% (the probability of total heating degree days actually being normal given that the forecast is for below normal heating degree days). This probability divided by the maximum would equal 0.67 (30 divided by 45), making the binsize 0.67 * 2000, or 1340. The binsize for all other bins would be computed likewise.

The binsize calculations are then used to limit the number of samples taken from each bin within the actual option pricing calculations. In this case, based upon the forecast, there is a smaller probability for above normal total heating degree days in January at Central Park than for below normal heating degree days. The binsize limits as calculated above assure that below normal degree day outcomes are properly oversampled relative to normal and above normal outcomes.

Having thus described the preferred embodiment of the present invention, the following is claimed as new and desired to be secured by letters patent:

1. A computer-readable memory device having a computer program stored thereon for directing the operation of a computer, said program comprising:

receiving means for receiving information representative of a location and a time-of-year interval and representative of historical weather data concerning a measurable, weather-related parameter regarding said location and time-of-year interval;

calculating means for calculating a financial rebate as a function of said historical weather data, a specified premium and a deviation in said weather-related parameter from a specified strike during said interval at said location; and output means for producing an output representative of said rebate.

2. The program as set forth in claim 1, said interval including a plurality of days.

3. The program as set forth in claim 1, said interval including at least a month.

4. The program as set forth in claim 1, said parameter including one of heating degree days, cooling degree days, rainfall, water run-off, river flow rates, water temperature, snow fall and snow accumulation.

5. The program as set forth in claim 1, said calculating means including means for calculating a maximum rebate for said premium.

6. The program as set forth in claim 1, said premium and rebate being expressed as a percentage.

7. The program as set forth in claim 1, for a given transaction, applying said premium and rebate percentages to the value of said transaction to obtain respective money amounts for said premium and rebate.

8. The program as set forth in claim 1, said interval including a plurality of days, said parameter including degree days, said receiving means further including means for receiving information representative of forecast weather data concerning said parameter for said interval;

said calculating means including means for sampling said historical weather data in accordance with said forecast weather data to yield a probable margin from said premium;

means for calculating a plurality of rebates corresponding to a plurality of selectable premiums with said rebates and premiums expressed as percentages; and means for applying a selected premium and rebate to the value of a given transaction.

9. The program as set forth in claim 1, said output being a weather guarantee insurance policy.

10. The program as set forth in claim 1, said calculating means including means for calculating a plurality of said rebates for a corresponding plurality of said premiums.

11. The program as set forth in claim 10, said calculating means including means for calculating a maximum rebate for each of said premiums.

12. The program as set forth in claim 1, said receiving means including means for receiving forecast weather data concerning said parameter for said interval.

13. The program as set forth in claim 12, said calculating means including means for sampling said historical weather data in accordance with said forecast weather data.

14. The program as set forth in claim 13, said calculating means including means for calculating said rebate so that said premium yields a probable margin in accordance with said sampling.

15. A computer having a weather guarantee computer program stored thereon for directing the operation of a computer, said computer comprising:

receiving means for receiving information representative of a location and a time-of-year interval and representative of historical weather data concerning a measurable, weather-related parameter regarding said location and time-of-year interval;

calculating means for calculating a financial rebate as a function of said historical weather data, a specified premium and a deviation in said weather-related parameter from a specified strike during said interval at said location; and output means for producing an output representative of said rebate.

16. The computer as set forth in claim 15, said interval including a plurality of days.

17. The computer as set forth in claim 15, said interval including at least a month.

18. The computer as set forth in claim 15, said parameter including one of heating degree days, cooling degree days, rainfall, water run-off, river flow rates, water temperature, snow fall and snow accumulation.

19. The computer as set forth in claim 15, said calculating means including means for calculating a maximum rebate for said premium.

20. The computer as set forth in claim 15, said premium and rebate being expressed as a percentage.

21. The computer as set forth in claim 15, for a given transaction, applying said premium and rebate percentages to the value of said transaction to obtain respective money amounts for said premium and rebate.

22. The computer as set forth in claim 15, said receiving means including means for receiving forecast weather data concerning said parameter for said interval.

23. The computer as set forth in claim 15, said calculating means including means for sampling said historical weather data in accordance with said forecast weather data.

24. The computer as set forth in claim 15, said calculating means including means for calculating said rebate so that said premium yields a probable margin in accordance with said sampling.

25. The computer as set forth in claim 15, said interval including a plurality of days, said parameter including degree days, said receiving means further including means for receiving information representative of forecast weather data concerning said parameter for said interval;

said calculating means including;

means for sampling said historical weather data in accordance with said forecast weather data to yield a probable margin from said premium;

means for calculating a plurality of rebates corresponding to a plurality of selectable premiums with said rebates and premiums expressed as percentages; and means for applying a selected premium and rebate to the value of a given transaction.

26. The computer as set forth in claim 15, said output being a weather guarantee insurance policy.

27. The computer as set forth in claim 15, said calculating means including means for calculating a plurality of said rebates for a corresponding plurality of said premiums.

28. The computer as set forth in claim 27, said calculating means including means for calculating a maximum rebate for each of said premiums.

29. A method of providing a financial weather guarantee comprising the steps of:

(a) receiving into a computer information representative of a location and a time-of-year interval, and representative of historical weather data and forecast weather data concerning a measurable, weather-related parameter regarding said location and time-of-year interval, said interval including a plurality of days;

(b) calculating in said computer according to a program stored in a computer readable memory device coupled therewith a financial rebate as a function of said historical weather data, said forecast weather data, a specified premium and a deviation in said weather-related parameter from a specified strike during said interval at said location, said premium and rebate being expressed as percentages;

step (b) including the step of sampling said historical weather data in accordance with said forecast weather data so that said premium includes a probable margin;

(c) applying in said computer said premium and rebate to the value of a transaction; and (d) producing an output representative of said rebate as said weather guarantee.

* * * * *